United States Patent [19]

Rosenqvist et al.

[11] Patent Number: 5,510,072
[45] Date of Patent: Apr. 23, 1996

[54] PROCESS FOR THE MANUFACTURE OF ELASTIC ARTICLES FROM POLY(MONOVINYLAROMATIC/CONJUGATED DIENE) BLOCK COPOLYMERS AND ELASTIC ARTICLES OBTAINABLE THEREWITH

[75] Inventors: John I. R. Rosenqvist; Teunis Graafland; Hans F. Vermeire, all of Louvain-la-Neuve, Belgium

[73] Assignee: Shell Oil Company, Houston, Tex.

[21] Appl. No.: 262,191

[22] Filed: Jun. 20, 1994

[30] Foreign Application Priority Data

Jun. 21, 1993 [EP] European Pat. Off. ............ 93201789

[51] Int. Cl.$^6$ ........................................... D01F 6/00
[52] U.S. Cl. ............... 264/184; 264/203; 264/205; 264/210.8
[58] Field of Search .................. 264/184, 203, 264/205, 210.8; 428/364, 394

[56] References Cited

U.S. PATENT DOCUMENTS

| | | | |
|---|---|---|---|
| 4,137,394 | 1/1979 | Meihuizen et al. | 528/500 |
| 4,369,284 | 1/1983 | Chen | 524/476 |
| 4,618,213 | 1/1984 | Chen | 524/476 |

FOREIGN PATENT DOCUMENTS

| | | |
|---|---|---|
| 0056875 | 12/1981 | European Pat. Off. . |
| 0105169 | 8/1983 | European Pat. Off. . |
| 0139141 | 8/1984 | European Pat. Off. . |
| 0144793 | 11/1984 | European Pat. Off. . |
| 0188078 | 11/1985 | European Pat. Off. . |
| 0211466 | 7/1986 | European Pat. Off. . |
| 0224389 | 11/1986 | European Pat. Off. . |
| 0229718 | 7/1988 | European Pat. Off. . |
| 0324135 | 12/1988 | European Pat. Off. . |
| 0327696 | 12/1988 | European Pat. Off. . |
| 0349146 | 6/1989 | European Pat. Off. . |
| 0400778 | 3/1990 | European Pat. Off. . |
| 0398434 | 5/1990 | European Pat. Off. . |
| 0519359 | 6/1992 | European Pat. Off. . |
| 62249653A | 10/1987 | Japan . |
| WO 88/00603 | 1/1988 | WIPO . |
| WO 91/05014 | 4/1991 | WIPO . |
| WO 92/10600 | 6/1992 | WIPO . |

*Primary Examiner*—Patrick J. Ryan
*Assistant Examiner*—J. M. Gray

[57] ABSTRACT

A process for the manufacturing of elastic articles such as fibers, yarns, or films, from substantially pure selectively hydrogenated block copolymers, comprising at least two blocks predominantly derived from monoalkylene aromatic monomer and at least one block predominantly derived from one or more conjugated dienes and having a number average molecular weight of at least 70,000, comprising the steps of preparing a solution or a gel of said block copolymer with an apolar organic non-aromatic solvent and processing said solution or gel through a fiber forming orifice.

11 Claims, No Drawings

PROCESS FOR THE MANUFACTURE OF ELASTIC ARTICLES FROM POLY(MONOVINYLAROMATIC/CONJUGATED DIENE) BLOCK COPOLYMERS AND ELASTIC ARTICLES OBTAINABLE THEREWITH

FIELD OF THE INVENTION

The invention relates to a process for the manufacture of elastic articles, such as a strand, fiber, yarn, or film from poly(monovinylaromatic/conjugated diene) block copolymers and to elastic articles such as strands, films, fibers, or yarns obtainable therewith. More in particular the invention relates to a process for the manufacture of elastic strand, film, fiber, or yarn from a solution or gel of the block copolymers, the poly(conjugated diene) internal blocks of which have been selectively hydrogenated.

BACKGROUND OF THE INVENTION

Elastic fibers and in particular elastic non-wovens were up to now manufactured from selectively hydrogenated poly-(monovinylaromatic/conjugated diene) block copolymer alone or mixtures thereof with other thermoplastic polymers and in particular poly(alkylene) by melt spinning and/or melt blowing techniques. Such techniques and the starting block copolymers to be used were known, e.g. from British patent applications Nos. 2,178,433, 2,197,874, German patent application No. 3625775, U.S. Pat. Nos. 4,789,699 and 4,692,371 and European patent applications Nos. 0030767, 0033569, and 0211466.

The prior art processes clearly had as limitation, that only relatively low molecular weight ($Mn \leq 100,000$; apparent molecular weight $\leq 140,000$) selectively hydrogenated block copolymers could be processed, due to melt flow requirements in such equipment.

In particular from European patent application 0033569 a method was described for the production of elastic fibers via the melt-blowing process. The fibers produced by said process were based on a selectively hydrogenated thermoplastic rubber e.g. KRATON G 1652 (KRATON is a trade mark), being a three block copolymer having polystyrene endblocks and a rubbery poly(ethylene-butylene) midblock. According to the teachings of said document, the thermoplastic rubber as such could not be extruded to form fibers and this only could be remedied by blending said thermoplastic rubber with fatty acids, such as stearic acid, in order to solubilize the thermoplastic rubber in the melt phase and to enable the extrusion of it into fibers without the occurrence of melt fracture.

However, in order to enhance the performance of the thus obtained elastic fibers, it was recommended to remove the substantial amount of stearic acid (20% by weight) as their presence impeded the elastic movement of the rubber molecules. A proposed method to accomplish this was to soak the fiber with isopropyl alcohol and this post treatment was not only cumbersome but made said process economically unattractive.

A further improvement of this concept was known from European patent application No. 0211466, disclosing a melt-spinnable or melt-blowable composition, comprising (a) 55 to 85 parts by weight of at least one three block copolymer having two endblocks A and a midblock B, wherein the blocks A were monoalkenyl arene polymer blocks and the B block is a substantially completely hydrogenated conjugated diene polymer block, the number average molecular weight of the or each three block copolymer being in the range of from 16,000 to 175,000, the number average molecular weight of the A blocks being in the range of from 4,000 to 30,000 and the monoalkenyl arene content of the or each three block copolymer being in the range of from 10 to 50% by weight of said three block copolymer, and (b) from 15 to 45 parts by weight of at least one two block copolymer C-D, wherein the C block is a monoalkenyl arene polymer block having a number average molecular weight in the range of from 4,000 to 30,000, and the D block is a substantially completely hydrogenated conjugated diene polymer block, having a number average molecular weight in the range of from 25 to 75% of the number average molecular weight of the midblock B of the or each three block copolymer, and wherein the total parts by weight of said three block copolymer(s) and of said two block copolymer(s) in said composition equals 100 parts by weight.

Although in page 5 of said European patent application, there was indicated that the total number average molecular weight of these three block copolymers and especially the upper limit thereof was primarily dictated by the at that time available equipment and should be at most 175,000 (apparent molecular weight 250,000), in the examples significantly lower number average molecular weight triblock copolymers were used ($M_n$ in the range from 33,000 to 70,000).

From the European patent application No. 0525628 was known a composite fiber having a single filament fineness of not more than 8 deniers and comprising a protective polymer component (A), comprising a fiber-forming thermoplastic polymer, and a polymer component (B) containing a large amount of an inorganic fine powder, said component comprising a hydrogenated block copolymer comprising poly-(vinyl aromatic) blocks and poly(conjugated diene) blocks and containing a specific phenol based compound (in particular hydroxy tert-butylphenyl compounds of depicted formula I therein). It will be appreciated that in particular with reference to Table 1 therein, the number average molecular weights of the complete triblock copolymers to be used to form the core of the composite core/shell fiber were in the range of from 50,000 to 100,000, i.e. relatively low number average molecular weights only.

Moreover, said fibers could not be regarded as elastic fibers, the object of the present invention, whereas the mechanical properties of said composite fibers were mainly stipulated by the type of the shell forming polymer component (A) preferably being polyester.

On the other hand, gel spinning processes for the manufacture of yarns and fibers, showing attractive tensile strength and stiffness, from polymers which were completely different from hydrogenated block copolymers were known from e.g. European patent applications Nos. 519359, 398434, 360358, 349146, 327696, 324135, 310171, 144793, 139141, 105169, 0056875 and U.S. Pat. No. 4,137,394 and PCT applications WO 90/14453, WO 92/10524 and WO 92/10600.

It will be appreciated that there is existing a growing need for higher tensile strength elastic articles, such as industrial fibers or yarns, derived from substantially pure, relatively high molecular weight block copolymers, i.e. having number average molecular weights more than 70,000, preferably more than 120,000, and more preferably more than 180,000, (corresponding to apparent molecular weights of 100,000, 170,000 and 255,000 respectively), derived from monovinyl aromatic monomers and conjugated diene monomers, the poly(conjugated diene) internal blocks of which have been selectively hydrogenated. However, it has appeared not possible up to now to prepare such desired fibers, yarns, or films by using conventional process methods from pure high molecular weight selectively hydrogenated block copolymers, i.e. free of the conventionally used processing aids and more in particular extender oils, which appeared to deteriorate the polymer properties in a certain degree.

Therefore it was an object of the present invention, to provide said desired high tensile strength elastic articles and in particular industrial fibers, yarns, or films derived from substantially pure selectively hydrogenated block copolymers of relatively high molecular weight.

A further object of the present invention was to provide a manufacturing process for said high tensile strength elastic articles such as industrial fibers, yarns, or films.

SUMMARY OF THE INVENTION

As a result of extensive research and experimentation, high tensile strength elastic fibers, yarns, or films have been produced by the process of the present invention using substantially pure selectively hydrogenated block copolymers, the block copolymers comprising at least two blocks, predominantly derived from monoalkylene aromatic monomer, and at least one block predominantly derived from one or more conjugated dienes and having a number average molecular weight of at least 120,000 and preferably more than 200,000. The process of the invention, comprising preparation of a solution or a gel of said block copolymer with an apolar organic non-aromatic solvent, processing said solution or gel through a fiber forming orifice and forming an initial article.

DETAILED DESCRIPTION OF THE INVENTION

The process of the invention, comprising preparation of a solution or a gel of a selectively hydrogenated block copolymer with an apolar organic non-aromatic solvent, processing said solution or gel through a fiber forming orifice and forming an initial article, the block copolymers comprising at least two blocks, predominantly derived from monoalkylene aromatic monomer, and at least one block predominantly derived from one or more conjugated dienes and having a number average molecular weight of at least 120,000 and preferably more than 200,000.

The process optionally comprises the steps of stretching the formed article to the required dimension; and optionally removing the remaining apolar organic solvent, by extraction and/or by evaporation and/or washing.

The poly(monoalkenylaromatic) blocks may predominantly be derived from styrene, alphamethylstyrene, tert.-butylstyrene, 4-propylstyrene, paramethylstyrene, other ring alkylated styrenes, 1-vinylnaphthalene, or 2-vinylnaphthalene as well as mixtures thereof. The preferred monomer is styrene.

The poly(conjugated diene) block may predominantly be derived from 1,3-butadiene, 2-methyl- 1,3-butadiene (isoprene), 2,3-dimethyl- 1,3-butadiene, 1,3-pentadiene, or 1,3-hexadiene as well as mixtures thereof. Isoprene or 1,3-butadiene, or mixtures thereof, are the preferred monomers.

With the terms "predominantly derived from . . . " as used throughout the present specification are meant that the starting monoalkenyl aromatic monomer or monomers may be optionally mixed with minor amount (<20% by weight) of a conjugated diene comonomer, preferably a conjugated diene to be incorporated in the poly(conjugated diene) block(s), or that the starting conjugated diene monomer or monomers may be optionally mixed with minor amounts (<20% by weight) of a monoalkenyl aromatic comonomer, preferably the monoalkenyl aromatic monomer to be incorporated into the poly(monoalkenylaromatic) blocks.

With the term "apparent molecular weight" as used throughout the specification is meant the molecular weight as determined by gel permeation chromatography using polystyrene standards by construing a calibration curve.

With the term "substantially pure selectively hydrogenated block copolymers" as used throughout the specification is meant hydrogenated block copolymers free from any significant amounts of other structurally not related polymers or usual auxiliaries. It will be appreciated that depending on the specific preparation route of the initial triblock copolymers to be hydrogenated, said final triblock copolymer mixtures comprise triblock copolymers alone or triblock copolymers mixed with a minor amount of selectively hydrogenated terminated precursor diblock, from which the starting triblock has been derived by coupling. Preferably pure triblock mixtures obtained by sequential polymerization are used.

The applied apolar organic solvent is preferably selected from non-substituted cycloalkanes or cycloalkenes having 5 to 20 carbon atoms or mixtures thereof and more preferably cycloalkanes having 5 to 18 carbon atoms or mixtures thereof. Preferably cyclohexane, cyclopentane, or decalin are used as the main solvent, optionally mixed with a cosolvent in minor amounts. Most preferably cycloalkanes, having 5 to 8 carbon atoms, are preferably used as pure solvent, but they can also be used as main solvent component, mixed with minor amounts of other apolar solvent such as straight or branched alkanes, containing from 5 to 8 carbon atoms and in particular isopentane, n-pentane, n-hexane, isohexane and n-heptane. Most preferably cyclohexane or cyclopentane are used.

With the term "selectively hydrogenated block copolymers" as used throughout the present specification, are meant block copolymers wherein the predominantly poly-(conjugated diene) blocks have been hydrogenated to a residual unsaturation degree of at most 20% and preferably lower than 10% and more preferably lower than 1%, whereas at most 25% of the aromatic double bonds from the vinylaromatic monomers have been hydrogenated and preferably less than 5%.

The predominantly poly(monovinylaromatic) blocks of the block copolymers to be used for the manufacture of fibers aimed at, have an apparent molecular weight in the range from 5,000 to 125,000 and preferably from 6,000 to 60,000.

The predominantly poly(conjugated diene) blocks, in the starting block copolymers, have an apparent molecular weight in the range from 10,000 to 300,000 and preferably in the range of from 50,000 to 250,000 and have a vinyl content of from 20 to 45% and preferably from 25 to 40% relative to the conjugated diene molecules.

The bound monoalkenyl aromatic content of the complete block copolymer is normally in the range of from 20 to 70% by weight and preferably from 25 to 60% by weight.

The apparent molecular weight of the total block copolymer will preferably be in the range of from 100,000 to 350,000 and more preferably from 200,000 to 300,000. Specific examples of such suitable starting block copolymers are those manufactured by Shell Chemical Company under the trade names KRATON®G 165 1 and KRATON®G 1654 elastomers.

The starting block copolymer is normally mixed with the apolar organic solvent in an amount in the range of from 5 to 50 parts by weight of block polymer per 100 parts by weight of solvent and preferably in the range from 10 to 40 parts by weight of block polymer per 100 parts by weight of solvent. The mixing temperature in should be selected just under the boiling point of the solvent. Most preferably 20 to 30 parts by weight of block copolymers per 100 parts by weight of solvent are used.

The solution or gel obtained is subsequently extruded at a temperature which is in general from 5° to 10° C. below the boiling point of the applied main solvent, more in particular when using cyclohexane this temperature will be in the range of from 60° to 90° C.

In general, the solution or gel, which was initially prepared from the block polymer and solvent, is converted into an elastic article consisting of the solution, which is then converted into a solvent containing object consisting of the block copolymer. This can take place in various conventional ways, such as dry spinning or dry extrusion, in which case an object consisting of the solution is formed and, for example, fed into an air duct into which, if desired, air or an inert gas is blown and in which cooling of the object evaporation of the solvent or both take(s) place.

Use can also be made of wet spinning or wet extrusion, in which case an object consisting of the solution or gel is formed which, after passing through a small air gap if appropriate, is fed into a liquid bath or successively in several liquid baths in a row, in which cooling is the object partial or complete extraction of the solvent from the object or both, take(s) place simultaneously or successively.

Another way of forming the object consisting of the solution is casting the solution on a plate, strip or roll, in which case the conversion of the object consisting of the solution to a solvent containing object consisting of the copolymer can take place in one of the ways described above.

In addition to the hereinbefore specified ways of converting the object consisting of the solution to a solvent containing object consisting mainly of copolymer, it has appeared to be possible to effect said conversion by bringing the object consisting of the solution into intimate contact with specific non-solvents for the copolymer, in which case the conversion appears to be effected by the penetration of non-solvent into the object apart from the removal of solvent from the object by the non-solvent which plays the major role in the case of extraction and also when the non-solvent has a temperature which is not or hardly lower than that of the object, so that cooling cannot play a role. Suitable non-solvents for this form of conversion are ketones, such as acetone and methyl ethyl ketone.

In the case of dry spinning and dry extrusion and in the case of casting of the solution on a strip or roll, the requisite intimate contact between the object, consisting of the solution, and the non-solvent can be effected by passing the non-solvent in vapor or atomized form into the air duct or over the object consisting of the solution. In the case of wet spinning and wet extrusion, the non-solvent may be present in the liquid bath into which the object is passed. Besides the non-solvent, an extractant may already be present in this liquid bath. The intimate contact with the non-solvent can also be produced by mixing the non-solvent with the solution shortly before the latter leaves the spinning or extrusion opening.

In the solvent removal processes, the solubility of the block copolymer in the object consisting of the solution decreases, either as a result of the cooling, or as a result of the removal of at least part of the solvent, or as a result of coming into contact with a suitable non-solvent, or as a result of a combination of these three, such that a separation takes place in the object consisting of the solution into a phase which essentially consists of the block copolymer and a phase, incorporated therein, which consists entirely or partially of the solvent. The object consisting of the solution is thus converted to a solvent-containing object consisting of the block copolymer, which object has sufficient rigidity to enable it to be handled in the requisite subsequent processing operations.

The liquids used as cooling liquid and/or extraction liquid are those in which the block copolymer does not dissolve or barely dissolves at the temperature used. Examples of such liquids are alkanols, such as methanol, ethanol and butanol, and in general liquids for which the dipole moment or the Hildebrand solubility parameter are sufficiently different from those of the before-mentioned solvents. If the phase separation, described above, in the article consisting of the solution essentially takes place as a consequence of extraction, the liquid used must be miscible with the solvent.

The removal of the solvent can take place in ways known per se, such as evaporation or extraction with a liquid which at the temperature used is not a solvent for the block copolymer but is miscible with the solvent.

The shape of the elastic article formed using the known techniques described above depends on the technique used and therefore, for example, on the surface onto which the solution is cast or on the opening through which the solution is spun or extruded. For example, with a broad slit of small height an object in film form can be produced, while fibers can be produced by using circular openings of small diameter.

In order to obtain an elastic article consisting of block copolymer and having the desired high tensile strength and modulus of elasticity, the elastic article obtained in one of the preceding process steps optionally can be stretched. A partial pre-stretching can already take place by applying a stretch tension to the elastic article, consisting of the solution, leaving the spinning or extrusion opening. However, irrespective of any pre-stretching, the object can be stretched at elevated temperature, and after complete or partial removal of the solvent, after the phase separation described above has taken place.

This stretching if desired takes place at elevated temperature, in particular above 125° C., but below the temperature at which thermal degradation of the block copolymer takes place to a significant degree and at all events below the melting point of the copolymer. In order to prevent degradation of the block copolymer it is advantageous to allow the stretching to take place in an inert atmosphere, such as nitrogen. If the object still contains solvent, the stretching temperature must also be below the temperature at which the block copolymer dissolves in the solvent at the concentration which then exists. During this stretching at elevated temperature, any solvent which is still present will as a rule evaporate from the object and preferably the stretching conditions are chosen such that the object is virtually solvent-free at the end of the stretching process. Any solvent residues still present after stretching can still be removed by, for example, evaporation or extracting, followed by drying.

It will be appreciated that the very attractive tensile strength and elongation at break measured on the elastic articles, such as fibers, strands, yarns, or films, obtainable by the hereinbefore specified processes, could in no way be expected by a person skilled in the art and the more not when having in mind the bad results when using other solvents such as toluene or amyl acetate, as can be clearly derived from the herein further on included comparative examples.

It is true that several elastomeric polymer oil compositions, derived from selectively hydrogenated block copolymers, were known from e.g. U.S. Pat. Nos. 3,827,999; 4,369,284; 4,709,982; 4,798,853; European patent applications Nos. 0224389; 0231462; 0299718; Japanese patent application (Kokai) J-62249653 and PCT applications WO 88/00603 and 91/05014. However, not any teaching could be found by a person skilled in the art in these publications for the preparation of fibers or yarns having attractive mechanical properties and being derived from substantially pure, relatively high molecular weight, hydrogenated block copolymers, derived from monovinylaromatic and conjugated dienes, as said publications are just directed to rather stable gel compositions of block copolymer and oils from which the oil component cannot easily be separated.

In particular in both PCT applications Nos. WO 88/00603 and 91/05014 the subject matter aimed at were block copolymer-oil compositions, which were very stable, homogeneous and free from phase separation and exudation of extender liquid (oil) and therefore certainly not easily to decompose during conventional gel spinning conditions.

It will be appreciated that another aspect of the present invention will be formed by the high tensile strength elastic articles such as fibers, strands, yarns, or films of substantially pure, relatively high molecular weight hydrogenated block copolymer derived from monoalkenyl aromatic and conjugated diene monomers, obtainable by the hereinbefore specified process.

With the term "yarns" as used throughout the specification is meant all types of products composed from initially obtained fibers or strands by subsequent processing of them by known methods.

The elastic articles of this invention can be used for example as reinforcing material in fabrics for medical and hygienic applications such as bandages and diapers. In particular the elastic articles such as fibers or yarns can be incorporated in a woven fabric derived from a nylon basic web. Moreover, the elastic articles according to the invention can be applied as reinforcing material in composites with rubbers, cement and other matrices for improving the impact strength and in general where the demand is for strong fibers, films, or tapes resistant to high temperatures.

The invention is illustrated by means of the following examples, however, without restricting the scope of the invention of these embodiments.

The parameters indicated in the examples are determined according to ASTM D 412.

EXAMPLE 1

A KRATON®G-1651 block copolymer and stabilizers (0.2 phr IRGANOX 1010, 0.2 phr Irganox PS 800 and 0.3 phr TINUVIN P) (IRGANOX and TINUVIN are trade marks) were weighed into a vessel. Cyclohexane was added to reach a solids content of 23wt %. The mixture was heated under stirring to 80° C., being the boiling point of cyclohexane. The solution was kept under reflux for one hour and then cooled down. The initially obtained high viscous solution at 80° C. behaved thereafter as a gel at room temperature.

The gel was transferred to an extruder (piston type) where it was heated up to 75° C. and extruded through a die of 2 mm diameter. The fiber was collected and the solvent evaporated at room temperature and thereafter subjected to tensile testing. The result is given in the table below.

| Diameter of fiber, | mm | 1.10 |
| Modulus 300%, | MPa | 2.5 |
| Tensile strength, | MPa | 34 |
| Strain at break, | % | 1050 |

The fibers obtained did not noticeably change in properties after being immersed in boiling water for at least 5 minutes.

EXAMPLE 2

The procedure of example 1 was repeated except that instead of cyclohexane a commercial mixture of mainly isoparaffins including decane and undecane (Shellsol T being the trade mark) was used in an amount to reach a solid content of 17%, whereas the mixture was heated under stirring to 180° C. The gel was kept at 180° C. for two hours and then cooled to 160° C. and the gel was extruded at 130° C. The result is given in the table below:

| Diameter of fiber | mm | 0.95 |
| Modulus 300% | MPa | 0.9 |
| Tensile strength | MPa | 15 |
| Strain at break, | % | 2100 |

Comparative Example 1

The procedure of example 1 was repeated, except that instead of cyclohexane toluene was used, whereas the mixture was heated under stirring to 110° C. and the solution was kept at 110° C. for one hour and then cooled down and the high viscous solution behaved as a gel at room temperature.

The gel was transferred to an extruder (piston type) where it was heated to 90° C. and extruded through a die of 2 mm diameter. The fiber was collected and the solvent evaporated at room temperature in air and under vacuum. A fiber with acceptable properties could not be obtained as appeared from premature breaking of the fiber in tensile testing. A clear yield point was observed when the fiber was subjected to tensile. The result is given in the table below.

| Diameter of fiber, | mm | 1.30 |
| Modulus 300%, | MPa | 3.2 |
| Tensile strength, | MPa | 16 |
| Strain at break, | % | 860 |

Comparative Example 2

The procedure of example 1 was repeated except that cyclohexane was replaced by amylacetate and the mixture was heated under stirring to 140° C., which is near the boiling point of amylacetate.

At about 60° C. the amylacetate starts to dissolve the polymer. The solution was kept at 140° C. for one hour and then cooled down to 110° C.

The hot gel was extruded in the same way at 120° C., the fiber was collected and the solvent evaporated at room temperature in air and under vacuum. A fiber with acceptable properties could not be obtained, as appeared from premature breaking of the fiber in tensile testing. A clear yield point was observed when the fiber was subjected to tensile strength. The result is given in the table below.

| Diameter of fiber, | mm | 1.30 |
|---|---|---|
| Modulus 300%, | MPa | 3.8 |
| Tensile strength, | MPa | 10 |
| Strain at break, | % | 600 |

We claim:

1. A process for the manufacturing of elastic articles, comprising the steps of:

preparing a solution or a gel of an apolar organic non-aromatic solvent selected from non-substituted cycloalkanes or cycloalkenes having 5 to 20 carbon atoms or mixtures thereof and a substantially pure selectively hydrogenated block copolymer, the block copolymer comprising at least two blocks predominantly derived from monoalkylene aromatic monomer selected from styrene, alphamethylstyrene, tert.-butylstyrene, 4-propylstyrene, paramethylstyrene, other ring alkylated styrenes, 1-vinylnaphthalene, 2-vinylnaphthalene or mixtures thereof, at least one block predominantly derived from one or more conjugated dienes selected from 1,3-butadiene, 2-methyl-1,3-butadiene(isoprene). 2,3-dimethyl-1,3-butadiene, 1,3-pentadiene, 1,3-hexadiene, or mixtures thereof, and a total number average molecular weight of at least 70,000; and processing the solution or gel through a fiber forming orifice.

2. The process according to claim 1, wherein the block copolymers have been derived from styrene and 1,3-butadiene or isoprene or mixtures of said dienes.

3. The process according to claim 1, wherein the apolar organic solvent is cyclohexane or cyclopentane.

4. The process according to claim 1, wherein the predominantly poly(monovinyl aromatic) blocks of the block copolymers have an apparent molecular weight in the range from 6,000 and 60,000.

5. The process according to claim 4, wherein the predominantly poly(conjugated diene) blocks in the starting block copolymers have an apparent molecular weight in the range of from 50,000 to 250,000.

6. The process according to claim 5, wherein the predominantly poly(conjugated diene) blocks in the starting block copolymers have a vinyl content in the range of from 25 to 60% by weight.

7. The process according to claim 6, wherein the block copolymer is a triblock copolymer that is free of hydrogenated precursor diblock copolymers.

8. The process according to claim 1, wherein the block copolymer is mixed with the solvent at 10 to 40 parts by weight of block copolymer per 100 parts by weight of the solvent.

9. The process according to claim 8, wherein the mixing temperature to form the solution or gel is selected just under the boiling point of the solvent.

10. The process according to claim 1, wherein the solution or gel is extruded at a temperature which is from 5° to 10° C. below the boiling point of the solvent.

11. The process according to claim 10, further comprising the steps of:

forming an initial article from the extruded solution or gel;

stretching the formed article; and removing remaining apolar organic solvent.

* * * * *